US011755879B2

(12) United States Patent
Pascanu et al.

(10) Patent No.: US 11,755,879 B2
(45) Date of Patent: Sep. 12, 2023

(54) LOW-PASS RECURRENT NEURAL NETWORK SYSTEMS WITH MEMORY

(71) Applicant: DeepMind Technologies Limited, London (GB)

(72) Inventors: Razvan Pascanu, Letchworth Garden City (GB); William Clinton Dabney, London (GB); Thomas Stepleton, London (GB)

(73) Assignee: DeepMind Technologies Limited, London (GB)

( * ) Notice: Subject to any disclaimer, the term of this patent is extended or adjusted under 35 U.S.C. 154(b) by 851 days.

(21) Appl. No.: 16/272,880

(22) Filed: Feb. 11, 2019

(65) Prior Publication Data

US 2019/0251419 A1  Aug. 15, 2019

Related U.S. Application Data

(60) Provisional application No. 62/628,748, filed on Feb. 9, 2018.

(51) Int. Cl.
*G06N 3/04* (2023.01)
*G06N 3/08* (2023.01)

(52) U.S. Cl.
CPC .............. *G06N 3/04* (2013.01); *G06N 3/08* (2013.01)

(58) Field of Classification Search
CPC .................................. G06N 3/04; G06N 3/08
See application file for complete search history.

(56) References Cited

U.S. PATENT DOCUMENTS

| | | | |
|---|---|---|---|
| 2010/0109938 A1* | 5/2010 | Oswald ................. | G01S 13/522 342/90 |
| 2015/0161991 A1* | 6/2015 | Sak ........................ | G10L 15/02 704/254 |
| 2017/0187747 A1* | 6/2017 | Huston, III ......... | H04L 63/1441 |
| 2019/0171913 A1* | 6/2019 | Cheng .................... | G06N 3/082 |

OTHER PUBLICATIONS

Generative Temporal Models With Memory arXiv:1702.04649v2 [cs.LG] Feb. 21, 2017) (Year: 2017).*

(Continued)

*Primary Examiner* — Li B. Zhen
*Assistant Examiner* — Moriam Mosunmola Godo
(74) *Attorney, Agent, or Firm* — Fish & Richardson P.C.

(57) ABSTRACT

Methods, systems, and apparatus, including computer programs encoded on a computer storage medium, for processing and storing inputs for use in a neural network. One of the methods includes receiving input data for storage in a memory system comprising a first set of memory blocks, the memory blocks having an associated order; passing the input data to a highest ordered memory block; for each memory block for which there is a lower ordered memory block: applying a filter function to data currently stored by the memory block to generate filtered data and passing the filtered data to a lower ordered memory block; and for each memory block: combining the data currently stored in the memory block with the data passed to the memory block to generate updated data, and storing the updated data in the memory block.

17 Claims, 5 Drawing Sheets

(56) References Cited

OTHER PUBLICATIONS

A Factorized Recurrent Neural Network Based Architecture for Medium to Large Vocabulary Language Modelling, 2016 IEEE Tenth International Conference on Semantic Computing (ICSC)) (Year: 2016).*
Feedforward Sequential Memory Networks: A New Structure to Learn Long-term Dependency) arXiv:1512.08301v2 [cs.NE] (Year: 2016).*
Electric Load Forecasting in Smart Grids Using Long-Short-Term-Memory based Recurrent Neural Network, IEEE, 2017 (Year: 2017).*
The Neural Hawkes Process: A Neurally Self-Modulating Multivariate Point Process) arXiv:1612.09328v3 [cs.LG] Nov. 21, 2017 (Year: 2017).*
Convolving over time via recurrent connections for sequential weight sharing in neural networks. 2017 International Joint Conference on Neural Networks (IJCNN). IEEE, 2017 (Year: 2017).*
ArthurGanson.com [online], "Machine With Concrete," available on or before Apr. 9, 2017, via Internet Archivee: Wayback Machine URL <https://web.archive.org/web/20170409233920/http://arthurganson.com/project/machine-with-concrete/>, retreived Nov. 21, 2019, URL< https://www.youtube.com/watch?v=5q-BH-tvxEg> 1 page [video submission].
Bahdanau, et al., "Neural machine translation by jointly learning to align and translate," International Conference on Learning Representations, arXiv:1409.0473, 2014.
Beattie, et al. "Deepmind lab," arXiv:1612.03801, 2016.
Bengio, et al., "Advances in optimizing recurrent networks," ICASSP, arXiv:1212.0901, 2012.
Bengio, et al., "Learning long-term dependencies with gradient descent is difficult," IEEE transactions on neural networks, 5(2):157-166, 1994.
Blundell, et al., "Model-free episodic control," arXiv: 1606.04460, 2016.
Brockman, et al., "OpenAI gym," arXiv:1606.01540, 2016.
Chelba, et al., "One billion word benchmark for measuring progress in statistical language modeling," CoRR, arXiv:1312.3005, 2014.
Cho, et al., "On the properties of neural machine translation: Encoder-decoder approaches," In Proceedings of SSST@EMNLP, arXiv:1409.1259, 2014.
Chung, et al., "Hierarchical multiscale recurrent neural networks,"International Conference on Learning Representations, arXiv:1609.01407, 2017.
Czarnecki, et al., "Understanding synthetic gradients and decoupled neural interfaces," in ICML, arXiv:1703.00522, 2017.
Danihelka, et al., "Associative long short-term memory," in Proceedings of the 33rd International Conference on Machine Learning, 48:1986-1994, 2016.
Dayan, "Improving generalization for temporal difference learning: The successor representation," Neural Computation, 5(4):613-624, 1993.
El Hihi and Bengio, "Hierarchical recurrent neural networks for long-term dependencies," in Proceedings of the 8th International Conference on Neural Information Processing Systems, NIPS'95, pp. 493-499, 1995.
Espeholt, et al., "IMPALA: Scalable Distributed Deep-RL with Importance Weighted Actor Learner Architectures," arXiv:1802.01561, Feb. 2018.
Fernandez, et al., "Sequence labelling in structured domains with hierarchical recurrent neural networks," in Proceedings of the 20th International Joint Conference on Artifical Intelligence, IJCAI'07, pp. 774-779, 2007.
Graves, "Generating sequences with recurrent neural networks," CoRR, arXiv:1308.0850, 2013.
Graves, et al., "Hybrid computing using a neural network with dynamic external memory," Nature, 538(7626):471, 2016.
Greff, et al., "A search space odyssey," IEEE Transactions on Neural Networks and Learning Systems, 28(10):2222-2232, 2017.
Gruslys, et al., "Memory-efficient backpropagation through time," In Advances in Neural Information Processing Systems, 9 pages, 2016.
Hochreiter and Schmidhuber, "Long short-term memory," Neural Computation, 9(8):1735-1780, 1997.
Holzmann and Hauser, "Echo state networks with filter neurons and a delay and sum readout," Neural Netw., 23:244-56, 2010.
Howard, "Memory as perception of the past: Compressed time in mind and brain," Trends in Cognitive Sciences, 22(2):124-136, 2018.
Jaderberg, et al., "Population based training of neural networks," CoRR, arXiv:1711.09846, 2017.
Jaderberg, et al., "Reinforcement learning with unsupervised auxiliary tasks," International Conference on Learning Representations, arXiv:1611.05397, 2016.
Jaeger, et al., "Optimization and applications of echo state networks with leaky-integrator neurons," Neural Netw., 20:335-52, 2007.
Kingma and Ba, "Adam: A method for stochastic optimization," International Conference on Learning Representations, arXiv:1412.6980, 2015.
Kong, et al., "Segmental recurrent neural networks," CoRR, International Conference on Learning Representations, arXiv preprint arXiv:1511.06018, 2016.
Koutnik, et al., "A clockwork RNN," International Conference on Machine Learning, 32:1863-1871, 2014.
Lin, et al., "Learning long-term dependencies in NARX recurrent neural networks," IEEE Transactions on Neural Networks, 7(6): 1329-1338, 1996.
Ling, et al., "Character-based neural machine translation," CoRR, International Conference on Learning Representations, arXiv:1511.04586, 2016.
Mikolov, et al., "Learning longer memory in recurrent neural networks," CoRR, International Conference on Learning Representations, arXiv:1412.7753, 2014.
Mirowski, et al., "Learning to navigate in complex environments," International Conference on Learning Representations, arXiv:1611.03673, 2017.
Mnih, et al., "Asynchronous methods for deep reinforcement learning," International Conference on Machine Learning, arXiv:1602.01783, 48:1928-1937, 2016.
Oliva, et al., "The statistical recurrent unit," ICML, arXiv:1703.00381, 2017.
Pascanu, et al., "On the difficulty of training recurrent neural networks," International Conference on Machine Learning, arXiv:1211.5063, 28:1310-1318, 2013.
Pearlmutter, "Gradient calculations for dynamic recurrent neural networks: A survey," IEEE Transactions on Neural networks, 6(5):1212-1228, 1995.
Pritzel, et al., "Neural episodic control," arXiv:1703.01988, 2017.
Schmidhuber, "Learning complex, extended sequences using the principle of history compression," Neural Computation, 4(2):234-242, 1992.
Sordoni, et al., "A hierarchical recurrent encoder-decoder for generative context-aware query suggestion," In Proceedings of the 24th ACM International on Conference on Information and Knowledge Management, CIKM '15, arXiv:1507.02221, 2015.
Spears, et al., "Scale-invariant temporal history (SITH): optimal slicing of the past in an uncertain world," arXiv:1712.07165, Dec. 2017.
Sprechmann, et al., "Memory-based parameter adaptation," International Conference on Learning Representations, 2018.
Stepleton, "The pycolab game engine," 2017, retrieved from URL <https://github.com/deepmind/pycolab/tree/master/pycolab>, 1 page.
Sukhbaatar, et al., "End-to-end memory networks," Advances in Neural Information Processing Systems, 2015, 9 pages.
Tallec and Ollivier, "Unbiased online recurrent optimization," arXiv:1702.05043, 2017.
Williams and Zipser, "A learning algorithm for continually running fully recurrent neural networks," Neural Computation, 1(2):270-280, 1989.

* cited by examiner

LOW-PASS RECURRENT NEURAL NETWORK SYSTEMS WITH MEMORY

CROSS-REFERENCE TO RELATED APPLICATION

This application claims priority to U.S. Provisional Application No. 62/628,748, filed on Feb. 9, 2018. The disclosure of the prior application is considered part of and is incorporated by reference in the disclosure of this application.

BACKGROUND

This specification relates to neural network systems with memory.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short term memory (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network

SUMMARY

This specification describes a recurrent neural network system implemented as computer programs on one or more computers in one or more locations.

According to one aspect a recurrent neural network system comprises an input arranged to receive a sequence of input vectors representing a sequence of observations, that is data items of an input sequence of data items. There may be one or more input layers, for example layers of a convolutional neural network, coupled to the input to process the input vectors and generate a sequence of latent representations of the observations, each latent representation comprising a set of one or more latent variables. A memory structure is coupled to receive and store a representation of the input vectors, for example a representation of the latent variables, as stored data. One or more output layers may be coupled to the memory layer to read and process the stored data to provide an output. The memory structure may comprise a sequence of memory layers in which one memory layer is coupled to a next memory layer in the sequence, for example in a chain. For each input vector in the sequence of input vectors the memory structure may be configured to perform operations comprising storing in a first memory layer a combination of a most recent set of latent variables and data previously stored in the first memory layer; and passing data stored by each memory layer to a next memory layer in the sequence of memory layers and storing in the next memory layer the passed data in combination with the data previously stored by the next memory layer.

The data previously stored in the first and subsequent memory layers may be attenuated before being combined with new data to be stored in the respective memory layer. For example storing in the first memory layer may comprise multiplying the most recent set of latent variables by $b^{-n}$ and multiplying the data previously stored in the first memory layer by $1-b^{-n}$ before storing the combination in the first memory layer. Storing in a subsequent memory layer may comprise multiplying the data passed on from the previous layer by $b^{-(n+l)}$ and multiplying the data previously stored in the next memory layer by $1-b^{-(n+l)}$ before storing the combination. Here n indexes the memory layer in the sequence of memory layers and n=1 may denote the first memory layer. l is a constant. l may be zero. The factors b may be defined or learned. The factors b may be a scalar values. For example, b may be a value in the range from 0 to 1. In another example, b may be a value greater than 1. The factors b may be layer-specific, that is each memory layer may have its own associated value for b. Alternatively, the same value for b may be used for all or for some subset of memory layers.

Passing data from one memory layer to a next memory layer may comprise passing data after blending the current and previous data in the one memory layer. Alternatively passing data from one memory layer to a next memory layer may comprise passing data before blending the current and previous data in the one memory layer, that is passing what was stored in the one memory layer at the previous time step. Thus the data passed may be data determined in a current sequence step or data which was previously stored in the one memory layer.

Each memory layer may comprise a set of units each providing a memory function to store a respective latent variable. The sequence of memory layers may define one or more chains, for example the sequence may be branched and stored information may be passed from one layer or "pool" to another by branching operations which copy a part of the information from one layer to another.

According to another aspect, a memory system comprises a first set of memory blocks, the memory blocks having an associated order. The memory system may be configured to execute operations at each of a plurality time steps. The time steps may correspond to inputs received by the memory system. For example, each time step may correspond to receipt of a new input by the memory system. In each time step, the memory system may be configured to pass input data to a highest ordered one of the first set of memory blocks. For each memory block for which there is a lower ordered memory block, the memory system may apply a filter function to data currently stored by the memory block to generate filtered data and pass the filtered data to a lower ordered memory block. The filter function may be a low-pass filter to attenuate (or smooth) the data as it is passed to subsequent ones of the memory blocks in the ordering. For each memory block, the memory system may be configured to combine the data currently stored in the memory block with the data passed to the memory block to generate updated data and to store the updated data in the memory block. The memory system may provide the memory layers of the recurrent neural network system described above.

The data that is passed from a first memory block to a second (e.g., lower-order) memory block may comprise data that was stored in the first memory block in the current time step (e.g., which itself is based on data that was passed to the first memory block in the current time step, either from the input data or from a higher-order memory block). That is, in some aspects, data may not be passed from a memory block until the data currently stored in the memory block has itself been updated. Alternatively, data that is passed from a first memory block to a second memory block may comprise data that was stored in the first memory block in a previous time step. That is, in some aspects, data may be passed from a memory block prior to the data stored in the memory block being updated with new data in the current time step. By passing, from a first memory block to a second memory block, data that was stored in the first memory block in the previous time-step, this may provide for more straightforward parallelization of the memory system.

The memory system may be configured to decay the data currently stored in the memory block to generate decayed data. Data that is currently stored in a first memory block may be decayed prior to the data that is currently stored in the first memory block being passed to a second memory block. Alternatively, data that is currently stored in a first memory block may be decayed only after the data stored in the first memory block has been passed to a second memory block. That is, the data that is passed from a first memory block to a second memory block may comprise a decayed version of the data currently stored in the first memory block or an "undecayed" version of the data stored in the first memory block.

It may be the decayed data that is combined with the data passed to the memory block to generate the updated data.

The system may be configured to decay the data currently stored in the memory block by multiplying the data currently stored in the memory block by a factor associated with the memory block. The factors may exponentially diminish. For example, the system may be configured to decay the data currently stored in the memory block by multiplying the data currently stored in the memory block by $b^{-(n+A)}$, where, b is the factor, n is the position of the memory block in the order and A is a constant, that could, for example, be zero.

The filter function may take the form $f(S_t)=St(1-b^{-(n+C)})$, where $S_t$ is the data currently stored in the memory block, b is the factor, n is the position of the memory block in the order and C is a constant. C may be zero.

The input data at each time step may be based on a sequence of input vectors. At each time step, the input data may be generated by processing one of the sequence of input vectors. For example, the input data may be generated by multiplying each input vector by $b^{-(1+D)}$, where b is a factor. D is a constant that could be zero.

As described above, the memory system may provide a memory structure for a neural network such as a recurrent neural network. The neural network may comprise one or more input layers configured to process a representation of a sequence of observations, generate a sequence of latent representations of the observations, each latent representation comprising a set of one or more latent variables, and provide the latent representations to the memory system to provide the input data.

A neural network system may comprise one or more output layers coupled to the memory system to read and process the data stored in the memory blocks to provide an output.

The memory system may comprise additional sets of memory blocks having a second associated order; and wherein one or more of the first set of memory blocks is configured to pass data to one or more of the second set of memory blocks.

According to other aspects, computer-implemented methods perform the processing described above with reference to the memory system and the recurrent neural network system.

In some implementations the memory system or recurrent neural network system may be incorporated into a reinforcement learning system in which an agent interacts with an environment by performing actions that are selected by the reinforcement learning system in response to receiving observations that characterize the current state of the environment. The reinforcement learning neural network subsystem may implement an advantage actor-critic reinforcement learning technique. Thus the one or more output layers may comprise an actor neural network output layer to select actions, from a continuous or discrete action space, to be performed by the reinforcement learning agent interacting and a critic neural network output layer to define a value for an error signal for training the reinforcement learning neural network system. The system may be considered as having an actor neural network and a critic neural network but in practice these may be separate heads on a common network sharing some parameters.

In more detail the recurrent neural network system may receive as input an observation and to process the observation to generate as the actor neural network output an action such as a control signal for a machine, for example for a vehicle or to control the joints of a mechanical agent such as a robot.

To train the actor neural network output the system repeatedly performs two environment interaction steps and a neural network training steps. In the environment interaction step, the system selects actions to be performed by the agent while the agent is interacting with the environment using the actor neural network in order to generate experience tuples. Experience tuples each generally include data identifying an observation that was received, an action that was performed in response to the observation, and the effects of performing the action on the environment. In the neural network training steps the system updates the values of the actor and critic network parameters. The critic neural network output is a neural network output that is configured to process an input observation and an input action in accordance with the current values of the parameters of the critic neural network to generate a neural network output that is an estimate of a return, i.e., a time-discounted sum of future actual rewards, that would result from the agent performing the input action in response to the input observation. Training may comprise, for each experience tuple of a minibatch, processing a training observation and a training action in the experience tuple using the critic neural network to determine a critic neural network output for the experience tuple in accordance with the current values of the parameters of the critic neural network; determining a target neural network output for the experience tuple from the training reward in the experience tuple and the next training observation in the experience tuple; determining an update to the critic neural network using errors between the target neural network outputs and the neural network outputs for the experience tuples in the minibatch; and determining an update to the current values of the parameters of the actor neural network using the critic neural network.

In some reinforcement learning applications the environment may be a simulated environment such as a video game or simulator and the agent may be implemented as one or more computer programs interacting with the simulated environment. In some other reinforcement learning applications the environment is a real-world environment and the agent is a mechanical agent interacting with the real-world environment. For example, the agent may be a robot interacting with the environment to accomplish a specific task, e.g., to move to a particular location or to interact with objects in the environment in some desirable way. As another example, the agent may be an autonomous or semi-autonomous vehicle navigating through the environment. In these implementations, the actions may be points in a space of possible control inputs to control the robot or the autonomous vehicle.

However applications of the recurrent neural network system are not restricted to reinforcement learning and include sequence classification tasks. More generally the system may be applied to any kind of digital data to generate a score or classification output. For example the input may be text, or audio such as spoken utterances, or video, or atomic position and/or connection data, and the output may be a score or classification for this data. Thus without limitation the recurrent neural network system may be part of: a speech synthesis system; a video processing system; a dialogue system; an autocompletion system; a text processing system; and a drug discovery system. The sequence of input vectors stored in the memory structure may therefore represent any sequence of data as determined by the application. By way of example only, the input vectors may represent sequential pixels (or groups of pixels) from an image, sequential textual characters within a body of text, sequential frames of a video, sequential audio samples, or sequential actions performed by a robot.

The subject matter described in this specification can be implemented in particular embodiments so as to realize one or more of the following advantages.

The recurrent neural network system described in this specification can more accurately generate outputs from received inputs for a variety of machine learning tasks. In particular, in order to facilitate processing of a given input from a sequence of inputs, the system can effectively use information from the processing of many preceding inputs in the sequence by reading from the memory structure. Similarly, in order to facilitate processing of subsequent inputs from the sequence, the system can store information generated during processing of the current input in the memory structure. Additionally, the size of the memory structure can be increased with a relatively low cost on the additional number of trainable parameters of the system. The system can provide relatively long-term memory storage, which can be used in training with a relatively smaller number of training steps, which can help mitigate problems such as vanishing gradient. Further, storage in the memory structure is relatively efficient so that information gained over much longer time intervals can be stored with relatively much reduced memory capacity requirements than hitherto.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
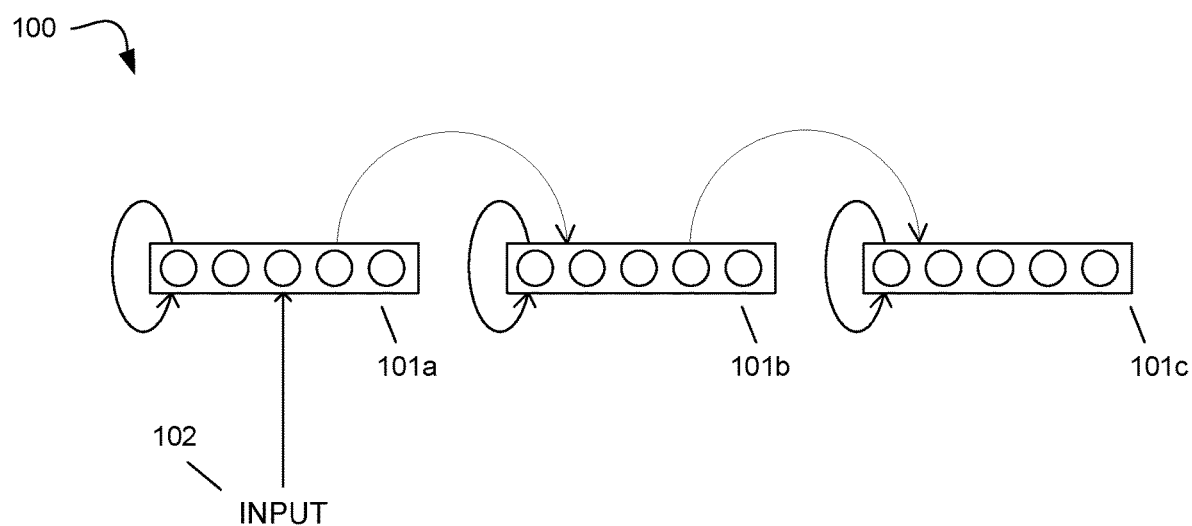
FIG. 1 shows an example memory system for a neural network.

FIG. 1 shows an example memory system 100 for a neural network. The memory system 100 is an example of a system implemented as computer programs on one or more computers in one or more locations, in which the systems, components, and techniques described below can be implemented.

The memory system 100 comprises a sequence of memory layers 101a, 101b, 101c in which one memory layer is coupled to a next memory layer in the sequence. As shown in FIG. 1, memory layer 101a is coupled to memory layer 101b which in turn is coupled to memory layer 101c. As such, the memory layers 101a, 101b, 101c are arranged in a chain structure. However, it will be appreciated that the memory system 100 may be arranged in alternative configurations other than a chain. For example, the memory system 100 may comprise a plurality of memory layers coupled together in any suitable topology such as branching structure. The memory layers may also be considered as an ordered set of memory blocks with each memory layer being equivalent to a memory block.

Each memory layer comprises a set of units providing a function to store data. The memory system 100 is coupled to an input 102. Input data received at the input 102 may be passed to the first memory layer 101a for storage. The input data may be combined with the data previously stored in the first memory layer 101a.

The memory system 100 is further configured to pass data stored by each memory layer to the corresponding next memory layer in the sequence of memory layers. For example, the data stored at memory layer 101a may be passed to memory layer 101b and the data stored at memory layer 101b may be passed to memory layer 101c. Each memory layer may then store the data passed to it in combination with the data that was previously stored by that memory layer. For example, memory layer 101b may store a combination of the data passed to it from memory layer 101a and the data that was already stored in memory layer 101b previously.

The memory system 100 may be further configured to attenuate or to apply a function to any of the data as part of passing data from one memory layer to another memory layer and/or as part of combining passed data with data previously stored in a memory layer. For example, at the first memory layer 101a, the data previously stored in the first memory layer 101a may be attenuated before storing the combination of the input data and the data previously stored in the first memory layer 101a. Likewise for other memory layers 101b, 101c, the data previously stored in these memory layers may be attenuated before storing the combination of the data passed to it from a coupled memory layer and the data previously stored in respective the memory layer prior to storing the combination in the respective memory layer. The data passed to a next memory layer may also be attenuated such the data passed to the next memory layer is attenuated data. Exemplary methods for the attenuation of data are provided below.

The memory system 100 is capable of adjusting the precision of the data stored in the memory depending on the age of the data. For example, the most recent data may be stored using a high fidelity representation that retains much of the specific details of the stored data whilst older data may have their representations adjusted to a lower fidelity that is more general in nature. In this way, it is possible to retain a larger amount of older data in the memory and it is possible to capture longer term dependencies of sequences of data using the memory than previously possible and also without impacting on the ability to capture short term dependencies that may require detailed representations.

Figure 2:
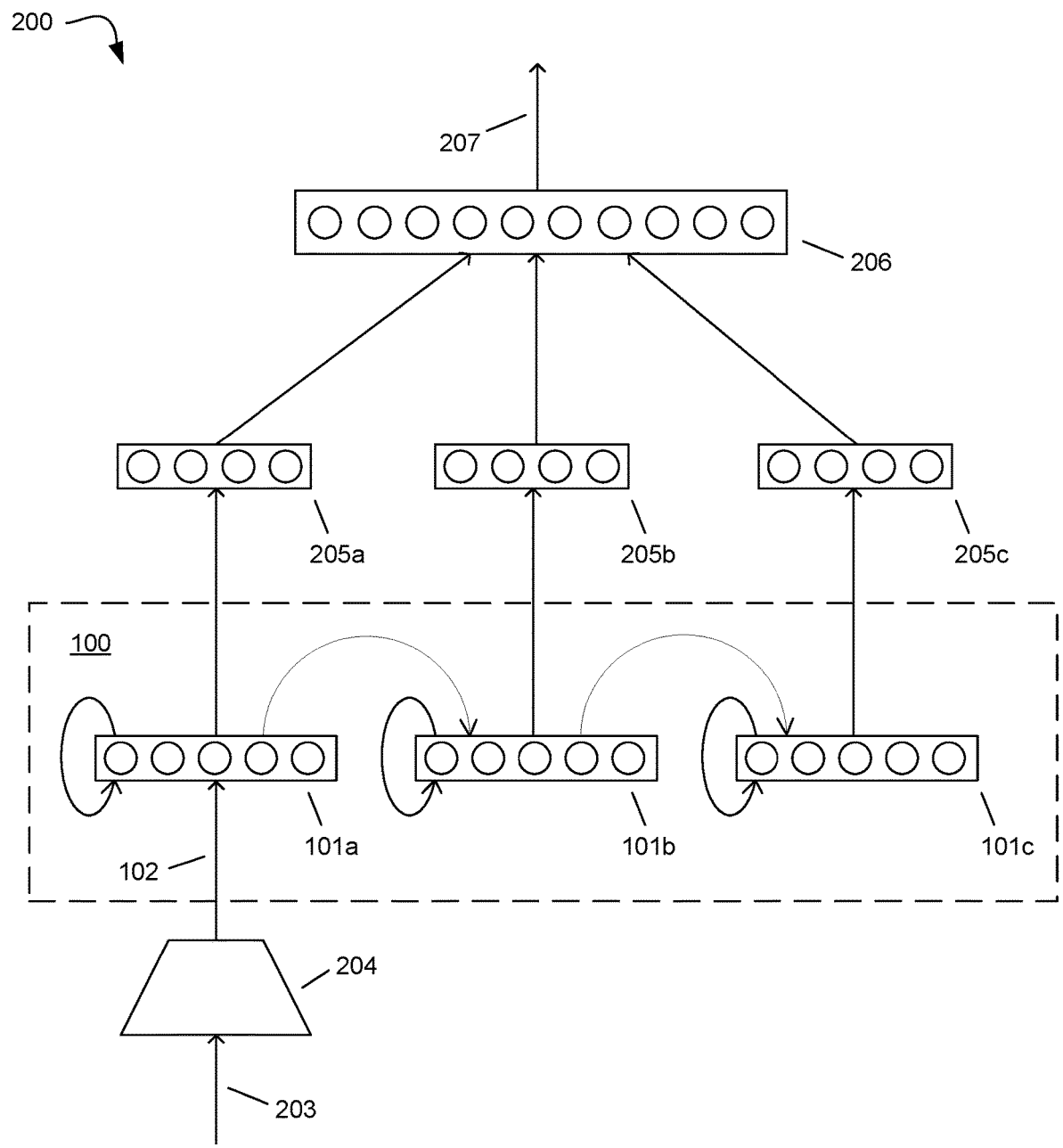
FIG. 2 shows an example neural network system including the memory system of FIG. 1.

Referring now to FIG. 2, the memory system 100 may be incorporated into a neural network system 200. The neural network system 200 may be a recurrent neural network. Because of this adjustment of the precision of the data stored in the memory depending on the age of the data as described above, the recurrent neural network system in which the memory system 100 is referred to as a "low-pass" recurrent neural network. In other words, a "low-pass" recurrent neural network is a recurrent neural network that incorporates a memory system that adjusts the precision of the data stored in the memory depending on the age of the data.

The neural network system 200 comprises an input 203 configured to receive a sequence of input vectors representing a sequence of observations. The sequence of observations may characterize the current state of an environment. For example, the environment may be a real-world environment in a mechanical agent such as a robot or autonomous vehicle is operating in.

Optionally, the input vectors may be processed by one or more neural network layers 204 to generate a latent variable representation for each of the input vectors. The one or more neural network layers may, for example, be a convolutional neural network or a multilayer perceptron (MLP). The latent variables may be provided to the memory system 100 via the memory system input 102 to store a representation of the input vectors as stored data. Alternatively, the neural network system input 203 may be directly coupled to the input 102 of the memory system 100.

The neural network system 200 comprises one or more output layers coupled to the memory system 100 to read and process the stored data to provide an output. In the example system 200 of FIG. 2, each memory layer is coupled to a respective first output layer, known as a viewport layer. That is, memory layer 101a is coupled to viewport layer 205a, memory layer 101b is coupled to viewport layer 205b and memory layer 101c is coupled to viewport layer 205c. Each viewport layer is configured to read the data stored in the corresponding memory layer and to perform an initial processing of the stored data.

A second shared output layer 206, known as a summarizer layer, is configured to process the viewport layer data to generate an output 207 of the neural network system 200. The output 207 may be coupled to further neural network layers for performing a specific task or application. For example, in a reinforcement learning application, the neural network system 200 may be part of an actor-critic neural network system. The neural network system 200 may be common to both actor and critic parts of the actor-neural network system and the output 207 may be coupled to an input of the actor and the critic network parts. In a classification application, the output 207 may be coupled to a classifier to provide a classification of the input 203.

Figure 3:
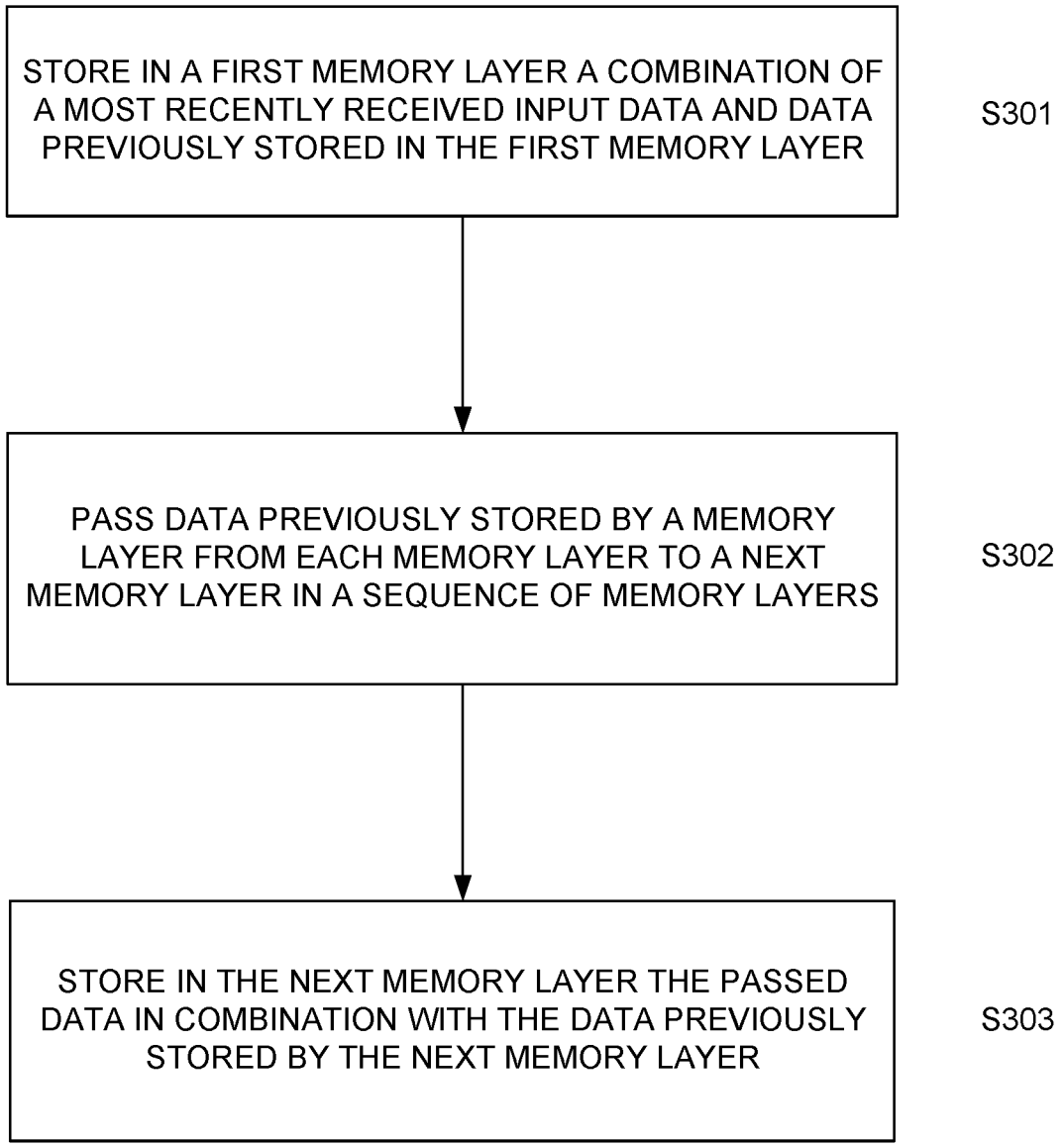
FIG. 3 shows exemplary processing for storing data in the memory system.

Referring now to FIG. 3, an exemplary process for writing to a memory system for a neural network such as the memory system 100 of FIG. 1 is shown.

At step S301, a first memory layer is used to store a combination of a most recently received input data and data previously stored in the first memory layer. At step S302, the data previously stored by a memory layer is passed from each memory layer to a next memory layer in a sequence of memory layers. In the next memory layer, the passed data is stored in combination with the data previously stored by the next layer at step S303.

As discussed above, in each of steps S301 to S303, the data may be attenuated prior to combining, storing or passing data on to the next memory layer. In an exemplary implementation, the data may be attenuated and stored according to the following equation:

$$p_t^{(n)} = a_n p_t^{(n-1)} + (1-a_n)p_{t-1}^{(n)} \quad (1)$$

where $p_t^{(n)}$ is the data (vector) to be stored at memory layer n at time step t, $p_t^{(n-1)}$ is the data that is passed to memory layer n from memory layer n−1, $p_{t-1}^{(n)}$ is the data previously stored at memory layer n at time step t−1, and $a_n$ is an attenuating parameter. Each memory layer may be initialized to zero, that is, $p_0^{(n)}=0$. At each time step t, input data $h_t$ may be passed to the first memory layer, that is, $p_t^0=h_t$ and attenuated by $a_n$ in accordance with Equation 1.

As can be seen from Equation 1, the data to be stored at a memory layer n is a weighted combination of the previously stored data at the memory layer, $p_{t-1}^{(n)}$, and the data passed to the memory layer from a coupled previous memory layer, $p_t^{(n-1)}$. Thus, the stored data is an average of new data to be stored and past data that has been stored at the respective memory layer. In this way, Equation 1 functions as a low-pass filter and provides a smoothed combination of new and past data.

The attenuating parameter $a_n$ may be set to $b^{(-n)}$, where b is a scalar value greater than 1. Thus, data is decayed using an exponentially diminishing smoothing factor when passed down through the memory layer sequence. Stored data at a memory layer is also decayed as it ages and is combined with new data at a particular memory layer to produce a smoothed average. In this way, the representational precision of data stored in the memory may be dependent on the age of the data. The most recent data may be stored using a more precise representation whilst older data may have their representations adjusted to be less precise and that is more general in nature. In this way, it is possible to retain a larger amount of older data in the memory and it is possible to capture longer term dependencies of sequences of data using the memory than previously possible and also without impacting on the ability to capture short term dependencies that may require more precise representations. For example, the system is capable of retaining useful information for hundreds of time steps which may be particularly useful in reinforcement learning applications where long-term credit assignment may be required.

Equation 1 defines a sequential updating process, whereby the stored data at each memory layer is updated one memory layer at a time in sequence. Alternatively, it is possible to update the stored data at each memory layer in parallel using only data from the previous time step.

Figure 4:
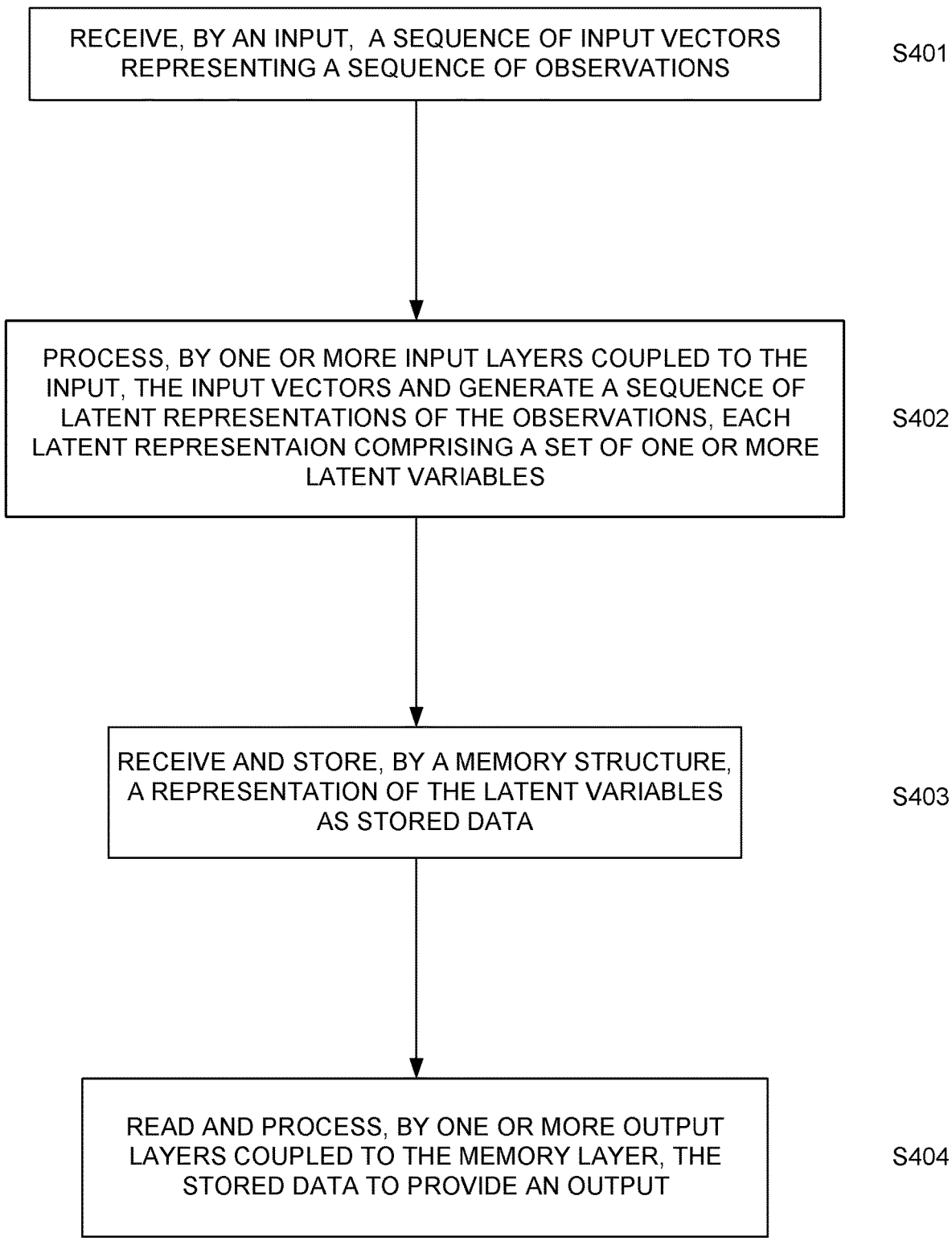
FIG. 4 shows exemplary processing for reading and storing data from the memory system.

Referring now to FIG. 4, an exemplary method for processing and storing inputs for use in a neural network is shown. The method may incorporate the processing of FIG. 3 and may be implemented by the neural network system 200 of FIG. 2.

At step S401, an input receives a sequence of input vectors representing a sequence of observations. The sequence of observations may characterize the current state of an environment and may be a real-world environment in a mechanical agent such as a robot or autonomous vehicle is operating in.

At step S402, one or more input layers coupled to the input processes the input vectors and generates a sequence of latent representations of the observations with each latent representation comprising a set of one or more latent variables.

A memory structure, such as the memory system 100 of FIG. 1, receives the latent variables and stores a representation of the latent variables as stored data at step S403. This may be carried out using the processing of FIG. 3 described above.

At step S404, one or more output layers coupled to the memory layer reads and processes the stored data to provide an output of the neural network system. The output may be used for performing a specific task or application. For example, in a reinforcement learning application, the output may be an input into an actor-critic neural network system. In a classification application, the output may be an input to a classifier to provide a classification of the sequence of input vectors.

Figure 5:
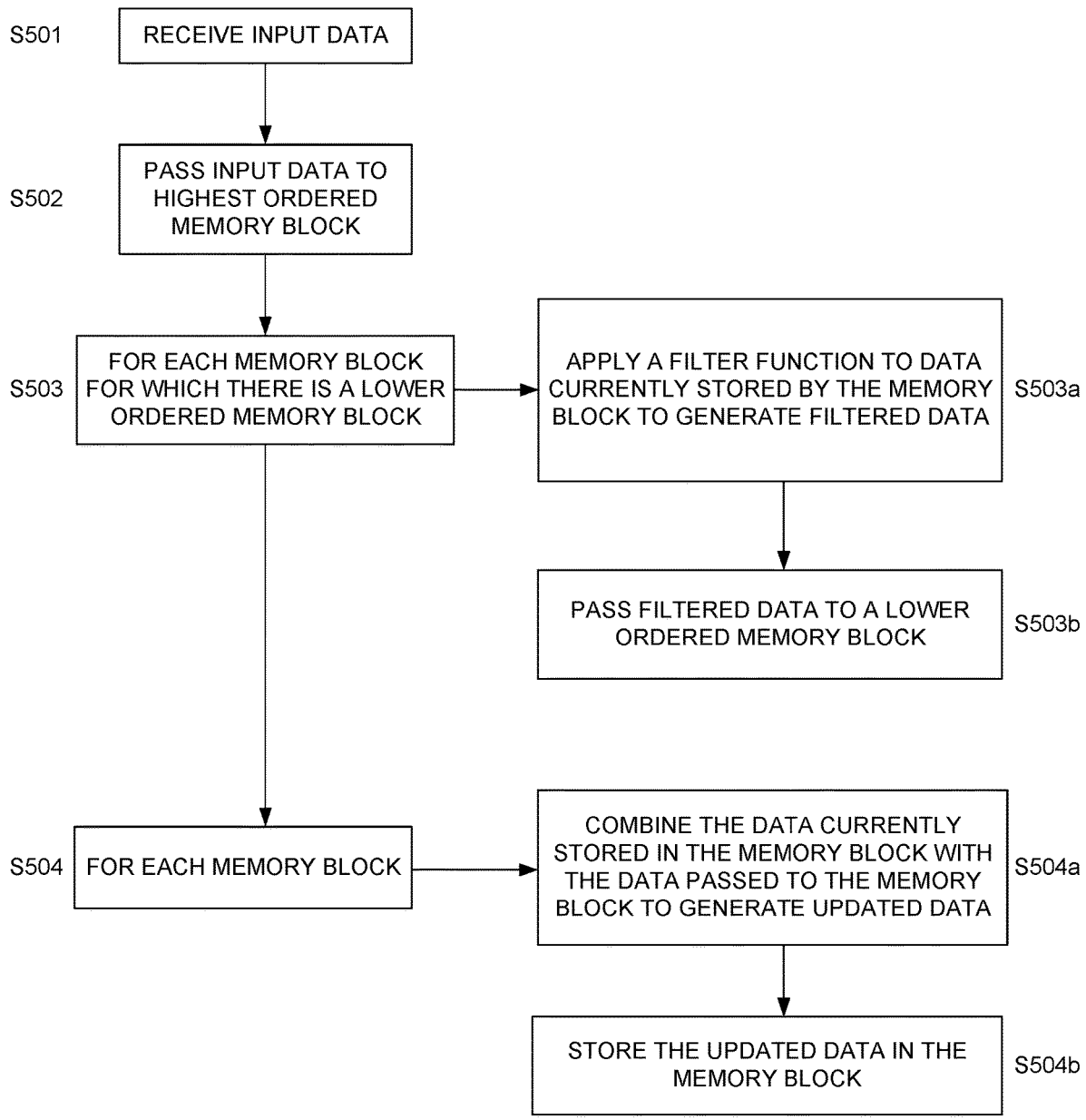
FIG. 5 shows further exemplary processing for storing data in the memory system.

Referring now to FIG. 5, another example of processing and storing inputs for use in a neural network is shown. The exemplary method of FIG. 5 may be implemented by the memory system 100 of FIG. 1 and may also be used in conjunction with the processing of FIG. 4.

At step S501, input data for storing in the memory system is received. The memory system comprises a first set of memory blocks having an associated order, for example, a sequential ordering. The input data is passed to the highest ordered memory block at step S502, which may be a first memory block in the sequential ordering.

For each memory block for which there is a lower ordered memory block, steps S503a and S503b are carried out. In more detail, a filter function is applied to data currently stored by the respective memory block to generate filtered data at step S503a. The filtered data is passed to a lower ordered memory block at step S503b.

Processing then proceeds to step S504, where for each memory block, the data currently stored in the respective memory block is combined with the data passed to the memory block to generate updated data at step S504a. The updated data is then stored in the respective memory block at step S504b.

The exemplary method of FIG. 5 may be carried out at each of a plurality of time steps. That is, a time step may correspond to receipt of new input data by the memory system and performing all of steps S501 to S504 in the time step. Alternatively, it is possible that no new input data is received in a time step but the operations of steps S503 and S504 may still be carried out in the time step.

The memory system may be trained as part of the training process for training the neural network system that the memory system is coupled to. For example, if memory system is coupled to an actor-critic neural network system, the memory system may be trained using parameter updates computed during the training of the actor-critic neural network. In another example, if the memory system is coupled to a classifier, the memory system may be trained using parameter updates computed during training of the classifier.

Parameter updates may be computed using a technique such as backpropagation through time (BPTT) where a neural network is unrolled over time to compute gradients used in determining weight updates for the network. In particular, truncated BPTT may be used which limits the number time steps that network is unrolled. Truncated BPTT produces more stable learning as running BPTT over a lengthy number of time steps may result in "vanishing gradients". However, given the fixed number of time steps considered, it is possible that truncated BPTT will fail to learn longer term correlations or where correlations do not occur within the time window being considered. The memory system of the present disclosure is advantageous in that it can enable truncated BPTT to learn correlations outside of the normal time window due to the ability of the memory system to store data for long intervals which may be orders of magnitude longer than the intervals used for backpropagating the gradients.

In some implementations, gradients are backpropagated through only a subset of the memory layers of the memory system. In some cases, gradients are only backpropagated through the first memory layer. Where one or more input layers exist in the neural network system, the gradients are backpropagated through the memory system and into the one or more input layers.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by and apparatus can also be implemented as a graphics processing unit (GPU).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, the method comprising:
   initializing, for each of a plurality of memory blocks, data stored in the memory block, the memory blocks being ordered according to a memory block order;
   at each of a plurality of time steps:
      obtaining input data for the time step;
      for a highest ordered memory block according to the memory block order, generating respective updated data for the highest ordered memory block for the time step by computing a weighted combination of (i) the data stored in the highest ordered memory block as of the time step with (ii) the input data for the time step and storing the respective updated data for the highest ordered memory for the time step in the highest ordered memory block;
      for each memory block after the highest ordered memory block according to the memory block order:
         generating respective updated memory data for the memory block for the time step by computing a weighted combination of (i) the data currently stored in the memory block as of the time step with (ii) respective updated data for the time step for a memory block that is one memory block higher in the memory block order than the memory block, wherein each memory block is assigned a respective attenuating parameter that is based on a respective position of the memory block in the memory block order, and wherein the weighted combination for each memory block after the highest ordered memory block (iii) assigns a weight equal to the respective attenuating parameter for the memory block to the data currently stored in the memory block as of the time step and (iv) assigns a weight equal to one minus the respective attention parameter for the memory block to the respective updated data for the time step for the memory block that is one memory block higher in the memory block order than the memory block; and
         storing the respective updated data for the memory block for the time step in the memory block and
   at each of the plurality of time steps, processing the respective updated data stored in each of the plurality of memory blocks at the time step using one or more output neural network layers to generate an output for the time step.

2. The method of claim 1, wherein the respective attenuating parameter is equal to a base value raised to a power that is equal to a negative of the position of the memory block in the memory block order.

3. The method of claim 1, wherein processing the respective updated data stored in each of the plurality of memory blocks at the time step using one or more output neural network layers to generate an output for the time step comprises:
   for each memory block, processing the respective updated data stored in the memory block using one or more respective viewport neural network layers that correspond to the memory block to generate respective viewport layer data for the memory block; and
   processing the respective viewport layer data for the memory blocks using one or more summarizer neural network layers to generate the output for the time step.

4. The method of claim 1, wherein obtaining input data for the time step comprises:
   receiving an observation for the time step; and
   processing the observation for the time step using one or more input neural network layers to generate the input data for the time step.

5. The method of claim 4, wherein the one or more input neural network layers comprise one or more convolutional neural network layers.

6. The method of claim 1, wherein the weighted combination for the highest ordered memory block according to the memory block order (iii) assigns a weight equal to the respective attenuating parameter for the highest ordered memory block to the data currently stored in the highest ordered memory block as of the time step and (iv) assigns a weight equal to one minus the respective attention parameter for the highest ordered memory block to the input data for the time step.

7. A system comprising one or more computers and one or more storage devices storing instructions that when executed by the one or more computers cause the one or more computers to perform operations comprising:
   initializing, for each of a plurality of memory blocks, data stored in the memory block, the memory blocks being ordered according to a memory block order;
   at each of a plurality of time steps:
      obtaining input data for the time step;
      for a highest ordered memory block according to the memory block order, generating respective updated data for the highest ordered memory block for the time step by computing a weighted combination of (i) the data stored in the highest ordered memory block as of the time step with (ii) the input data for the time step and storing the respective updated data for the highest ordered memory for the time step in the highest ordered memory block;
      for each memory block after the highest ordered memory block according to the memory block order:
         generating respective updated memory data for the memory block for the time step by computing a weighted combination of (i) the data currently stored in the memory block as of the time step with (ii) respective updated data for the time step for a memory block that is one memory block higher in the memory block order than the memory block, wherein each memory block is assigned a respective attenuating parameter that is based on a respective position of the memory block in the memory block order, and wherein the weighted combination for each memory block after the highest ordered memory block (iii) assigns a weight equal to the respective attenuating parameter for the memory block to the data currently stored in the memory block as of the time step and (iv) assigns a weight equal to one minus the respective attention parameter for the memory block to the respective updated data for the time step for the memory block that is one memory block higher in the memory block order than the memory block; and storing the respective updated data for the memory block for the time step in the memory block and at each of the plurality of time steps, processing the respective updated data stored in each of the plurality of memory blocks at the time step using one or more output neural network layers to generate an output for the time step.

8. The system of claim 7, wherein the respective attenuating parameter is equal to a base value raised to a power that is equal to a negative of the position of the memory block in the memory block order.

9. The system of claim 7, wherein processing the respective updated data stored in each of the plurality of memory blocks at the time step using one or more output neural network layers to generate an output for the time step comprises:

for each memory block, processing the updated data stored in the memory block using one or more respective viewport neural network layers that correspond to the memory block to generate respective viewport layer data for the memory block; and processing the respective viewport layer data for the memory blocks using one or more summarizer neural network layers to generate the output for the time step.

10. The system of claim 7, wherein obtaining input data for the time step comprises:

receiving an observation for the time step; and processing the observation for the time step using one or more input neural network layers to generate the input data for the time step.

11. The system of claim 10, wherein the one or more input neural network layers comprise one or more convolutional neural network layers.

12. The system of claim 7, wherein the weighted combination for the highest ordered memory block according to the memory block order (iii) assigns a weight equal to the respective attenuating parameter for the highest ordered memory block to the data currently stored in the highest ordered memory block as of the time step and (iv) assigns a weight equal to one minus the respective attention parameter for the highest ordered memory block to the input data for the time step.

13. One or more non-transitory computer-readable storage media storing instructions that when executed by one or more computers cause the one or more computers to perform operations comprising:

initializing, for each of a plurality of memory blocks, data stored in the memory block, the memory blocks being ordered according to a memory block order;

at each of a plurality of time steps:

obtaining input data for the time step;

for a highest ordered memory block according to the memory block order, generating respective updated data for the highest ordered memory block for the time step by computing a weighted combination of (i) the data stored in the highest ordered memory block as of the time step with (ii) the input data for the time step and storing the respective updated data for the highest ordered memory for the time step in the highest ordered memory block;

for each memory block after the highest ordered memory block according to the memory block order:

generating respective updated memory data for the memory block for the time step by computing a weighted combination of (i) the data currently stored in the memory block as of the time step with (ii) respective updated data for the time step for a memory block that is one memory block higher in the memory block order than the memory block, wherein each memory block is assigned a respective attenuating parameter that is based on a respective position of the memory block in the memory block order, and wherein the weighted combination for each memory block after the highest ordered memory block (iii) assigns a weight equal to the respective attenuating parameter for the memory block to the data currently stored in the memory block as of the time step and (iv) assigns a weight equal to one minus the respective attention parameter for the memory block to the respective updated data for the time step for the memory block that is one memory block higher in the memory block order than the memory block; and storing the respective updated data for the memory block for the time step in the memory block; and at each of the plurality of time steps, processing the respective updated data stored in each of the plurality of memory blocks at the time step using one or more output neural network layers to generate an output for the time step.

14. The non-transitory computer-readable storage media of claim 13, wherein the respective attenuating parameter is equal to a base value raised to a power that is equal to a negative of the position of the memory block in the memory block order.

15. The non-transitory computer-readable storage media of claim 13, wherein processing the respective updated data stored in each of the plurality of memory blocks at the time step using one or more output neural network layers to generate an output for the time step comprises:

for each memory block, processing the updated data stored in the memory block using one or more respective viewport neural network layers that correspond to the memory block to generate respective viewport layer data for the memory block; and processing the respective viewport layer data for the memory blocks using one or more summarizer neural network layers to generate the output for the time step.

16. The non-transitory computer-readable storage media of claim 13, wherein obtaining input data for the time step comprises:

receiving an observation for the time step; and processing the observation for the time step using one or more input neural network layers to generate the input data for the time step.

17. The non-transitory computer-readable storage media of claim 13, wherein the weighted combination for the highest ordered memory block according to the memory block order (iii) assigns a weight equal to the respective attenuating parameter for the highest ordered memory block to the data currently stored in the highest ordered memory block as of the time step and (iv) assigns a weight equal to one minus the respective attention parameter for the highest ordered memory block to the input data for the time step.

* * * * *